(12) United States Patent
Song et al.

(10) Patent No.: US 9,839,887 B2
(45) Date of Patent: Dec. 12, 2017

(54) APPARATUS FOR STORING GAS HYDRATE PELLETS

(71) Applicants: Dongguk University Industry-Academic Cooperation Foundation, Seoul (KR); Dongshin Hydraulics Co., Ltd., Busan (KR); Korea Gas Corporation, Seongnam-si, Gyeonggi-do (KR); Sungilturbine Co., Ltd., Busan (KR); Daewoo Engineering & Construction Co., Ltd., Seoul (KR); STX Offshore & Shipbuilding Co., Ltd., Changwon-si, Gyeonsangnam-do (KR)

(72) Inventors: Myung Ho Song, Seoul (KR); Jung Woong Eun, Hwaseong-si (KR); Byoung Seok Lim, Seongnam-si (KR); Seung Hee An, Ansan-si (KR); Sang Yup Jang, Ansan-si (KR); Jae Won Lee, Seoul (KR); Sang Min Kim, Busan (KR); Jin Seop Yang, Busan (KR); Ta Kwan Woo, Busan (KR)

(73) Assignees: Dongshin Hydraulics Co., Ltd., Busan (KR); Korea Gas Corporation, Seongnam, Gyeonggi-Do (KR); Sungilturbine Co., Ltd., Busan (KR); Daewoo Engineering & Construction Co., Ltd., Seoul (KR); Stx Offshore & Shipbuilding Co., Ltd., Gyeongsangnam-Do (KR)

(*) Notice: Subject to any disclaimer, the term of this patent is extended or adjusted under 35 U.S.C. 154(b) by 294 days.

(21) Appl. No.: 14/768,432

(22) PCT Filed: Jun. 27, 2013

(86) PCT No.: PCT/KR2013/005693
§ 371 (c)(1),
(2) Date: Aug. 17, 2015

(87) PCT Pub. No.: WO2014/208792
PCT Pub. Date: Dec. 31, 2014

(65) Prior Publication Data
US 2016/0001241 A1 Jan. 7, 2016

(51) Int. Cl.
*B01F 7/20* (2006.01)
*B65G 65/46* (2006.01)
(Continued)

(52) U.S. Cl.
CPC .......... *B01F 7/20* (2013.01); *B01F 15/00155* (2013.01); *B01F 15/00389* (2013.01);
(Continued)

(58) Field of Classification Search
CPC ...................................................... B01F 7/20
(Continued)

(56) References Cited

U.S. PATENT DOCUMENTS 1,521,044 A * 12/1924 Parker ................. B01F 7/00416
366/266
1,858,796 A * 5/1932 Wilcoxson .............. C10B 47/18
23/313 R
(Continued)

FOREIGN PATENT DOCUMENTS

JP 08-337324 A 12/1996
JP 2002-220353 A 8/2002
(Continued)

OTHER PUBLICATIONS

International Search Report for PCT/KR2013/005693 dated Feb. 6, 2014.

*Primary Examiner* — Abbas Rashid
(74) *Attorney, Agent, or Firm* — Locke Lord LLP; Howard M. Gitten (57) ABSTRACT

The present invention provides an apparatus for storing gas hydrate pellets that includes: a storage tank having an inlet formed at a top portion thereof for having gas hydrate pellets injected therein; a transfer part formed at a lower portion of the storage tank so as to transfer the injected gas hydrate pellets to an outside of the storage tank; a rotating shaft vertically formed in the storage tank; a plurality of division plates coupled to the rotating shaft to partition an internal space of the storage tank, each having a bottom portion thereof formed above a top portion of the transfer part; an extension plate coupled to a lower portion of each of the division plates in such a way that the extension plate is movable up and down; and a guide formed at an upper portion of the transfer part and configured to guide the extension plate so as to allow the extension plate to be revolved by rotation of the rotating shaft without an interruption with the transfer part.

17 Claims, 5 Drawing Sheets

(51) Int. Cl.
*C10L 3/10* (2006.01)
*B65G 65/48* (2006.01)
*B01F 15/00* (2006.01)
*B01F 15/02* (2006.01)
*B01F 15/06* (2006.01)

(52) U.S. Cl.
CPC .......... *B01F 15/0289* (2013.01); *B01F 15/06* (2013.01); *B65G 65/46* (2013.01); *B65G 65/4836* (2013.01); *C10L 3/108* (2013.01); *B01F 2015/061* (2013.01)

(58) Field of Classification Search
USPC ........ 366/280, 282–283, 285, 287–288, 308, 366/314, 318–324, 325.1–325.5, 366/327.1–327.4, 329.3, 330.1, 332–335
See application file for complete search history.

(56) References Cited

U.S. PATENT DOCUMENTS

| | | | | |
|---|---|---|---|---|
| 2,181,404 A | * | 11/1939 | Hartung | .................... C12C 7/24 198/676 |
| 2,247,439 A | * | 7/1941 | Hawes | ...................... B01F 7/24 366/266 |
| 2,509,543 A | * | 5/1950 | Truax | ..................... B65G 33/00 198/669 |
| 2,554,769 A | * | 5/1951 | Arnold | .................... F26B 17/18 198/670 |
| 2,859,019 A | * | 11/1958 | O'Neill, Jr. | ......... B01F 7/00183 366/280 |
| 3,019,895 A | * | 2/1962 | Loevenstein | ............. B03B 5/02 134/132 |
| 5,683,178 A | * | 11/1997 | Nakamoto | .......... B01F 7/00175 366/325.3 |
| 6,241,381 B1 | * | 6/2001 | Noda | .................. B01F 7/00591 366/262 |
| 2008/0314935 A1 | | 12/2008 | Spargo | |

FOREIGN PATENT DOCUMENTS

| | | |
|---|---|---|
| JP | 2007-262376 A | 10/2007 |
| JP | 2009-035372 A | 2/2009 |

* cited by examiner

APPARATUS FOR STORING GAS HYDRATE PELLETS

CROSS-REFERENCE TO RELATED APPLICATIONS

This application is the national phase under 35 U.S.C. §371 of PCT International Application No. PCT/KR2013/005693, filed Jun. 27, 2013, the entire contents of the aforementioned application is hereby incorporated herein by reference.

BACKGROUND

1. Technical Field

The present invention relates to an apparatus for storing gas hydrate pellets, more specifically to an apparatus for storing gas hydrate pellets capable of pulverizing the pellets adhered with one another during the storage and of discharging the pulverized pellets but of adjusting the amount of discharged gas hydrate pellets according to a process speed.

2. Background Art

Natural gas is a clean fossil fuel of which the demand has skyrocketed globally and the resource development has been fiercely competed because it generates significantly smaller quantities of carbon dioxide per fuel mass during the combustion than coal and petroleum.

Natural gas that is produced from gas fields is used as fuel through transportation and storage processes after removing mostly sulfur, carbon dioxide, water and polymer hydrocarbon but methane.

Since the price of natural gas is mostly dependent upon the facility and operation costs of implementing the above processes in addition to the margin and interest, the most economical transportation and storage method is selected, considering various factors such as the size of the gas field and the distance to the consumer. The most typical marine transportation method is the LNG (liquefied natural gas) method, and the compressibility of LNG is about 600 when it is normal condition methane.

Nonetheless, the economic feasibility of the LNG method is restricted due to the cryogenic requirement of LNG, and thus the LNG method is applicable for gas fields larger than a specific scale (i.e., currently at least about 3 trillions of cubic feet).

In order for methane, which is the main component of natural gas, to exist stably as a liquid under atmospheric pressure, the temperature needs to be −162 degrees Celsius or lower. Accordingly, metal materials used in the LNG facility exposed to cryogenic conditions need to include high concentrations of expensive nickel so as to minimize the brittleness. Moreover, due to a great difference in temperature between the inside and the outside during the transportation and storage processes, heat influx causes a large amount of BOG (boil off gas) generation.

In order to achieve economic feasibility of developing relatively small scale gas fields by overcoming these shortcomings and saving production costs of natural gas, GTS (gas to solid) technologies have been widely studied to transport/store natural gas using solid gas hydrate as storage medium. Particularly, in 1990, a Norwegian professor, named Prof. Gudmundsson, presented the self-preservation effect theory of hydrate to motivate many industrialized nations, such as Japan, to develop key technologies required for realizing commercial GTS methods.

Natural gas hydrate (NIGH), which is a crystalline mixture in which natural gas molecules are encapsulated within solid state lattices of hydrogen-bonding water molecules, has an external shape that is similar to ice and maintains its solid state stably if a pressure that is higher than a certain value is applied at a given temperature. In order for methane hydrate to stably exist thermodynamically under atmospheric pressure, the temperatures needs to be −80 degrees Celsius or lower, but the self-preservation effect of delaying the decomposition of hydrate for several weeks is discovered when ice film is formed on the surface of a hydrate particle at temperatures of about −20 degrees Celsius.

The gas compressibility of NGH is about 170 (that is, about 170 cc of normal condition natural gas is stored in 1 cc of hydrate), which is more disadvantageous than LNG, but the temperature condition for transportation and storage of NGH is more advantageous. Accordingly, it has been theoretically verified that the GTS method using NGH is an economically alternative option of the LNG method for small-to-medium scale gas fields.

The GTS technology involves production, transportation/storage and regasification processes. Natural gas produced at gas fields are converted to hydrate under a relatively high-press, low-temperature environment during the production process and then are formed in natural gas hydrate pellets (NGHP) through dehydration, refrigeration, decompression and pellet formation processes. Before the natural gas hydrate pellets are regasified, the natural gas hydrate pellets are transported and stored in pellet forms under the condition of atmospheric pressure and near −20 degrees Celsius.

The conventional pellet storage technology, which is adopted as a process system element in most continuous process lines of various industrial plants, has various types available, depending on the stored material and the use of storage tank. Among these, the silo type, which is a vertical type storage tank having an inlet at the top portion thereof and an outlet at the bottom portion thereof, has a rate of the diameter or width to the height of the storage tank that is 1:1.5 or greater, having a relatively great height rate compared to a bunker. The outlet of the silo-type storage tank may be mostly either a gravity feed type or a rotary feed type. The gravity feed type, which discharges particulate materials by use of falling movements by the self-load of particulate materials, uses a chute having an angle of inclination. The rotary feed type, which is installed in a cylindrical shape of casing and is equipped with a rotor with blades, often uses a rotary feeder that, while the rotor rotates, fills the particulate materials fallen by gravity between the blades and discharges the particulate materials to the bottom.

While the conventional storage tank technology is adopted with the basic concept of the silo tank and the rotary feeder, it still lacks a sufficient technology for readily loading and unloading pellets despite adhesion of the pellets and adhesion between the pellets and the storage tank structure.

The related art is disclosed in Korean Patent Publication No. 2011-0024095 (SILO FOR PELLET TYPE REFUSE DERIVED FUEL; laid open on Mar. 9, 2011).

SUMMARY

An embodiment of the present invention provides an apparatus for storing gas hydrate pellets that can inject gas hydrate pellets successively into a storage tank having an internal space divided therein and discharge the gas hydrate pellets successively from the storage tank but can pulverize the pellets adhered with one another during the storage and adjust the amount of the gas hydrate pellets discharged from the storage tank according to a process speed.

An embodiment of the present invention provides an apparatus for storing gas hydrate pellets that includes: a storage tank having an inlet formed at a top portion thereof for having gas hydrate pellets injected therein; a transfer part formed at a lower portion of the storage tank so as to transfer the injected gas hydrate pellets to an outside of the storage tank; a rotating shaft vertically formed in the storage tank; a plurality of division plates coupled to the rotating shaft to partition an internal space of the storage tank, each having a bottom portion thereof formed above a top portion of the transfer part; an extension plate coupled to a lower portion of each of the division plates in such a way that the extension plate is movable up and down; and a guide formed at an upper portion of the transfer part and configured to guide the extension plate so as to allow the extension plate to be revolved by rotation of the rotating shaft without an interruption with the transfer part.

A floor of the storage tank may be formed in a spiral shape that is split up and down with the transfer part therebetween and is elevated against a direction of rotation of the rotating shaft.

The extension plate may include a roller at a lower portion thereof, and the guide may include a rail configured to guide the roller.

The guide may be provided in plurality.

The extension plate may be slidably coupled to each of the division plates.

The division plates may be provided in three that are separated by 120 degrees from one another.

The transfer part may include a screw conveyor configured for pulverizing and transferring the gas hydrate pellets.

The apparatus for storing gas hydrate pellets may further include a buffer tank formed in between the transfer part and the regasification part and configured for receiving the gas hydrate pellets.

The apparatus for storing gas hydrate pellets may further include a sensor formed on the buffer tank and configured for measuring an amount of gas hydrate pellets received in the buffer tank.

The apparatus for storing gas hydrate pellets may further include a controller configured for controlling a speed of rotation of the rotating shaft by comparing the amount of gas hydrate pellets measured by the sensor against a predetermined value.

The sensor may be provided in plurality at different heights.

The apparatus for storing gas hydrate pellets may further include an up conveyor formed in between the transfer part and the buffer tank and configured for transferring the gas hydrate pellets in an upward direction.

The up conveyor may be a bucket elevator.

The apparatus for storing gas hydrate pellets may further include a temperature control part installed on the storage tank and configured for controlling a temperature inside the storage tank.

The temperature inside the storage tank may be maintained at between −25 degrees and −15 degrees Celsius by the temperature control part.

A screw of the screw conveyor may be configured to have different pitches formed therein along a direction in which the gas hydrate pellets are transferred.

The screw of the screw conveyor may be configured to have the pitches increased along the direction in which the gas hydrate pellets are transferred.

With the embodiment of the present invention, it is possible to inject gas hydrate pellets successively into a storage tank having an internal space divided therein and discharge the gas hydrate pellets successively from the storage tank but pulverize the pellets adhered with one another during the storage and adjust the amount of the gas hydrate pellets discharged from the storage tank according to a process speed.

DETAILED DESCRIPTION

Since there can be a variety of permutations and embodiments of the present invention, a certain embodiment will be illustrated and described with reference to the accompanying drawings. This, however, is by no means to restrict the present invention to a certain embodiment, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

The terms used in the description are intended to describe a certain embodiment only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof and shall not be construed to preclude any presence or possibility of one or more other characteristics, numbers, steps, operations, elements, parts or combinations thereof.

Hereinafter, a certain embodiment of an apparatus for storing gas hydrate pellets in accordance with the present invention will be described in detail with reference to the accompanying drawings. Identical or corresponding elements will be given the same reference numerals, regardless of the figure number, and any redundant description of the identical or corresponding elements will not be repeated.

Figure 1:
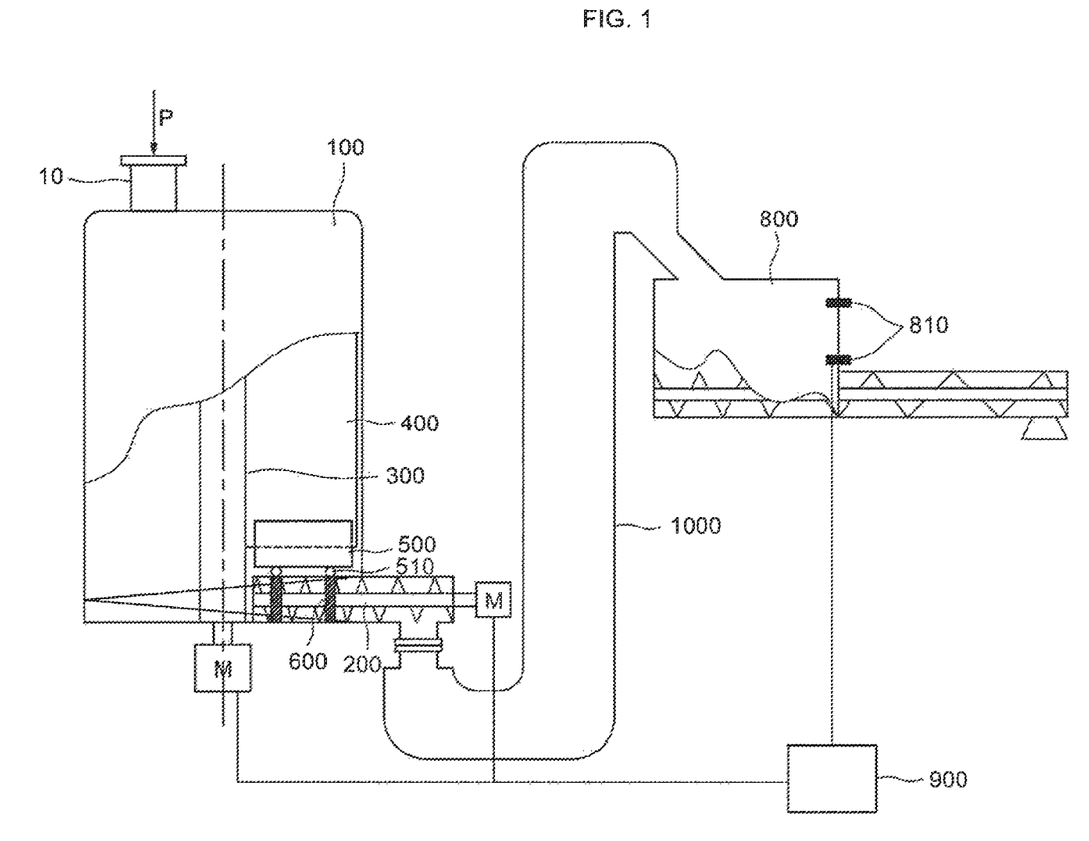
FIG. 1 shows an apparatus for storing gas hydrate pellets in accordance with an embodiment of the present invention.
Figure 2:
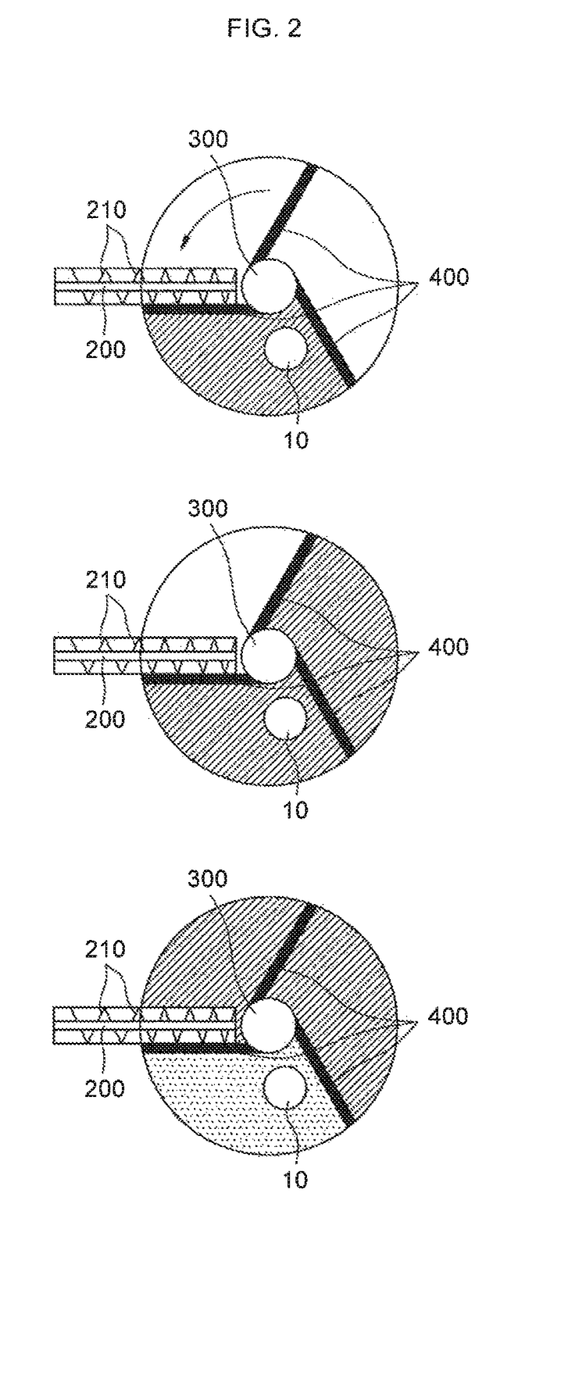
FIG. 2 illustrates how gas hydrate pellets are successively injected to and discharged from a storage tank of the apparatus for storing gas hydrate pellets in accordance with an embodiment of the present invention.
Figure 3:
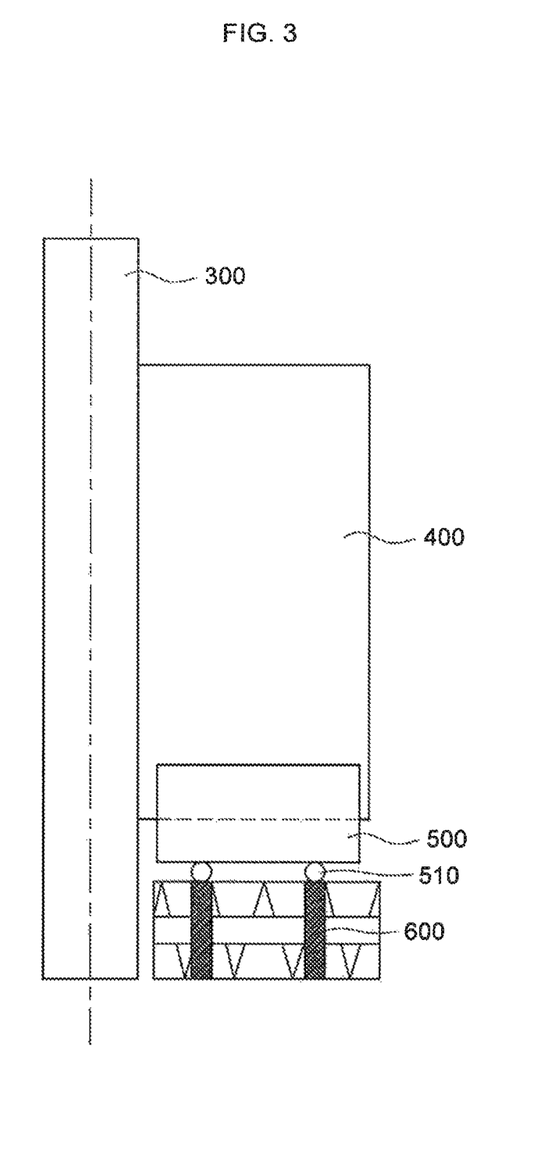
FIG. 3 is a cross-sectional view showing how an extension plate of the apparatus for storing gas hydrate pellets in accordance with an embodiment of the present invention is guided by a guide.
Figure 4:
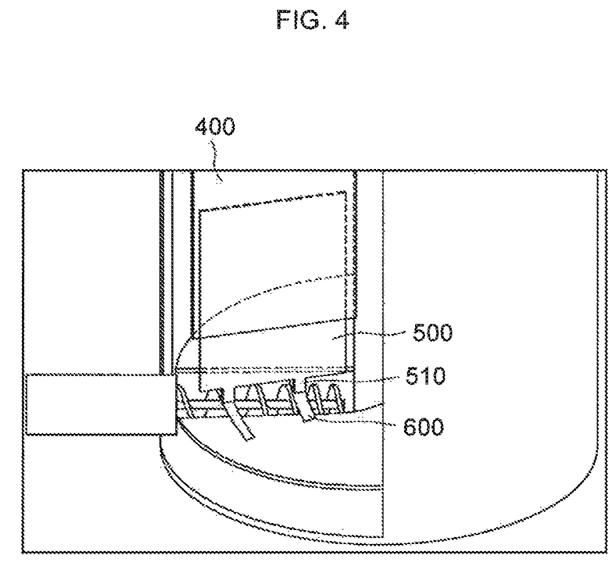
FIG. 4 illustrates how an extension plate of the apparatus for storing gas hydrate pellets in accordance with an embodiment of the present invention is guided by a guide.
Figure 5:
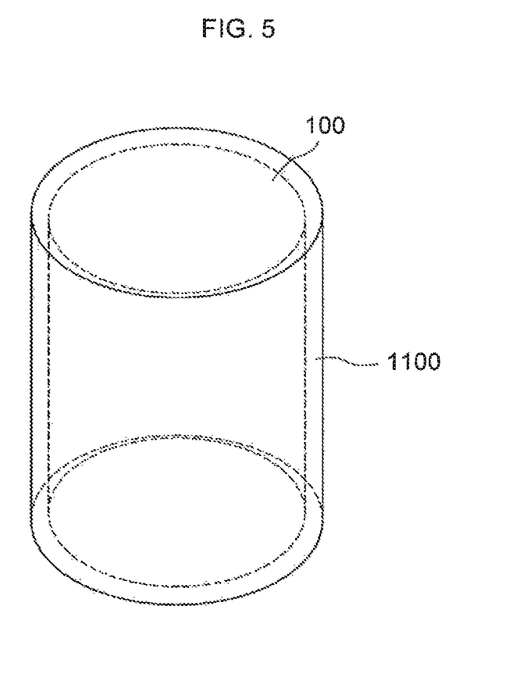
FIG. 5 show a temperature control part of the apparatus for storing gas hydrate pellets in accordance with an embodiment of the present invention.

FIG. 1 shows an apparatus for storing gas hydrate pellets in accordance with an embodiment of the present invention. FIG. 2 illustrates how gas hydrate pellets are successively injected to and discharged from a storage tank of the apparatus for storing gas hydrate pellets in accordance with an embodiment of the present invention. FIG. 3 is a cross-sectional view showing how an extension plate of the apparatus for storing gas hydrate pellets in accordance with an embodiment of the present invention is guided by a guide. FIG. 4 illustrates how an extension plate of the apparatus for storing gas hydrate pellets in accordance with an embodiment of the present invention is guided by a guide. FIG. 5 show a temperature control part of the apparatus for storing gas hydrate pellets in accordance with an embodiment of the present invention.

As illustrated in FIG. 1, an apparatus for storing gas hydrate pellets in accordance with an embodiment of the present invention may include a storage tank 100, a transfer part 200, a rotating shaft 300, a division plate 400, an extension plate 500 and a guide 600.

The storage tank 100 has an inlet 10 provided on top thereof and has gas hydrate pellets P ("pellets" hereinafter) injected to an inside thereof.

As illustrated in FIG. 5, the storage tank 100 may further include a temperature control part 1100 that is a silo type in a cylindrical shape having a greater length in a vertical direction thereof than a diameter thereof and is configured to be operated within a temperature range of the self-preservation effect of the pellets P.

Here, a temperature inside the storage tank 100 may be maintained −25 to −15 degrees Celsius.

The storage tank 100 has a cooling jacket formed on an outside thereof, and the cooling jacket has cold water flowing therein to adjust the temperature inside the storage tank 100.

Moreover, the storage tank 100 has an observation window installed on an external wall thereof to allow a user to check the loadage of pellets P inside the storage tank 100 through the observation window.

The transfer part 200, which transfers the injected pellets P from the storage tank 100 to the outside for regasification, is formed at a lower portion of the storage tank 100.

The storage tank 100 has the rotating shaft 300 vertically formed therein at a center thereof, and the rotating shaft 300 has a plurality of division plates 400 coupled thereto.

The plurality of division plates 400 are configured to partition an internal space of the storage tank 100, and the pellets P injected through the inlet 10 are divided and stored in the partitioned storage tank 100.

While the pellets P are stored, adhesion may be occurred between a pellet P and another pellet P or between a pellet P and an internal structure of the storage tank 100.

The division plate 400 of the apparatus for storing gas hydrate pellets in accordance with an embodiment of the present invention may revolve to prevent the pellet P from being adhered with the storage tank 100 and the pellet P from being adhered with another pellet P.

As shown in FIG. 2, the storage tank 100 of the apparatus for storing gas hydrate pellets in accordance with an embodiment of the present invention may have 3 division plates 400 formed therein, each separated by 120 degrees.

That is, the pellets P are divided and stored in the storage tank 100 having the inside thereof partitioned into 3 spaces by the division plates 400.

As illustrated in FIG. 2, the pellets P injected successively in the partitioned spaces may be discharged successively through the transfer part 200.

That is, after the pellets P are injected into a first filling space, the rotating shaft 300 is rotated by 120 degrees to have a second filling space filled with the pellets P, and then the rotating shaft 300 is rotated by 120 degrees again to have a third filling space filled with the pellets P successively.

Here, the discharging speed of the pellets P may be controlled by adjusting the speed of rotation of the rotating shaft 300, and the amount of discharged pellets P may be adjusted according to the speed of processing the discharged pellets P.

As shown in FIG. 3 and FIG. 4, the plurality of division plates 400 are formed above the transfer part 200 formed in the lower portion of the storage tank 100.

The division plates 400 coupled to the rotating shaft 300 are revolved by the rotation of the rotating shaft 300, and as the division plates 400 revolve, the pellets P injected into the partitioned storage tank 100 are transferred to the transfer part 200.

Here, a bottom of the division plate 400 is formed sufficiently higher than a top of the transfer part 200 so that the division plate 400 does not interfere with the transfer part 200 when the division plate 400 revolves.

Moreover, the extension plate 500 is coupled to a lower portion of the division plate 400 in such a way that the extension plate 500 is movable up and down, in order to move the pellets P loaded on a floor of the storage tank 100 to the transfer part 200.

When the division plate 400 revolves near the transfer part 200, the extension plate 500 may move upward at the lower portion of the division plate 400 to prevent an interference between the transfer part 200 and the division plate 400.

As shown in FIG. 3 and FIG. 4, the apparatus for storing gas hydrate pellets in accordance with the present embodiment may include the guide 600 formed to surround a portion of the transfer part 200 and configured to guide the extension plate 500 in such a way that the extension plate 500 may mount the guide 600 and revolve when the division plate 400 revolves near the transfer part 200.

An interruption between the extension plate 500 and the transfer part 200 may be avoided because the extension plate 500 is moved up and down by the guide 600 to revolve through the guide 600.

Here, the extension plate 500 may include a roller 510 at a lower portion thereof, and the guide 600 may have a guide rail, corresponding to the roller 510, formed thereon.

The roller 510 may be formed as a wheel, which may travel over the transfer part 200 through the guide rail formed on the guide 600 without being interrupted by the transfer part 200 when the extension plate 500 revolves.

Moreover, the guide 600 may be provided in plurality so as to allow the extension plate 500 to be in balance when the extension plate 500 travels over the transfer part 200.

Although there are two guides 600 formed in the present embodiment, it is possible that a greater number of guides 600 are formed, if necessary.

Here, the extension plate 500 may be slidably coupled with the division plate 400.

In the case where the division plate 400 having the extension plate 500 slide-coupled therewith revolves, the extension plate 500 moves up and down along a spirally-shaped floor to allow the pellets P in the lower portion of the storage tank 100 to be maximally rotated and moved.

Here, the floor of the storage tank 100 may be formed in a spiral shape that is split up and down with the transfer part 200 therebetween.

Specifically, the floor of the storage tank 100 has a spiral shape that is elevated against the direction of rotation of the rotating shaft 300, and thus the spirally-shaped floor has a stepped difference about the transfer part 200.

Accordingly, the pellets P accumulated on the floor of the storage tank 100 are moved by the rotation of the division plate 400 and the extension plate 500 along the floor of the storage tank 100 that descends in the direction of rotation, thereby being transferred to the transfer part 200 eventually.

As illustrated in FIG. 4, when the roller 510 provided at the lower portion of the extension plate 500 rolls and travels over the transfer part 200, an upper portion of the extension plate 500 is slid to move upward through the lower portion of the division plate 400.

The transfer part 200 induces an ascending motion of the extension plate 500 to prevent any collision or damage from occurring between the transfer part 200 and the extension plate 500.

The transfer part 200, which is configured to successively discharge the pellets injected successively into the storage tank 100 and to transfer the pellets P to a regasification part 700, may be formed as a screw conveyor so as to allow the pellets P to be pulverized while being transferred.

The screw conveyor may disjoin the adhered pellets P and transfer the pellets P to an entrance of the regasification part 700.

Here, a screw 210 of the screw conveyor may have different pitches formed therein along a direction in which the pellets P are transferred.

That is, by increasing the pitch along the direction in which the pellets P are transferred, an efficiency of transferring the accumulated pellets P may be improved.

As illustrated in FIG. 1, the apparatus for storing gas hydrate pellets in accordance with the present invention may further include a buffer tank 800 at one end of the transfer part 200.

The buffer tank 800 may be formed at the one end of the transfer part 200 to receive the pellets P temporarily.

The apparatus for storing gas hydrate pellets in accordance with the present invention may include a sensor 810 for measuring the amount of pellets P received in the buffer tank 800 and may further include a controller 900 for controlling the speed of rotation of the rotating shaft 300 by comparing the amount of pellets P measured by the sensor 810 against a predetermined value.

Here, the sensor 810 may be formed in plurality, which are formed, respectively, at different heights, for example, two sensors 810 installed above and below each other in an embodiment of the present invention.

When the amount of pellets P inside the buffer tank 800 is decreased because there are more pellets P being discharged and processed from the buffer tank 800 than the pellets P being transferred from the storage tank 100, the speed of rotation of the rotating shaft 300 inside the storage tank 100 is increased to allow a sufficient amount of pellets to be supplied into the buffer tank 800.

On the contrary, when the amount of pellets P accumulated in the buffer tank 800 is increased because there are less pellets P being transferred from the storage tank 100 than the pellets P being discharged and processed from the buffer tank 800, the speed of rotation of the division plate 400 may be decreased to adjust the amount of pellets P being transferred into the buffer tank 800.

Accordingly, the amount of pellets P being transferred from the storage tank 100 may be adjusted according to the rate of the pellets P being discharged from the buffer tank 800 and processed.

The apparatus for storing gas hydrate pellets in accordance with the present invention may further include an up conveyor 1000 formed in between the transfer part 200 and the buffer tank 800 to transfer the gas hydrate pellets P upwardly.

Here, the up conveyor 1000 may be firmed as a bucket elevator.

As the pellets P are transferred by the transfer part 200 at a height of the floor of the storage tank 100 because the transfer part 200 is installed at the lower portion of the storage tank 100, the up conveyor 1000 is further provided in order to transfer the pellets P to a pellet processing device that is arranged at a higher location than the floor of the storage tank 100.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims. It shall be also appreciated that a large number of other embodiments than the above-described embodiment are included in the claims of the present invention.

What is claimed is:

1. An apparatus for storing gas hydrate pellets, comprising:
    a storage tank having an inlet formed at a top portion thereof for having the gas hydrate pellets injected therein;
    a transfer part formed at a lower portion of the storage tank so as to transfer the injected gas hydrate pellets to an outside of the storage tank;
    a rotating shaft vertically formed in the storage tank;
    a plurality of division plates coupled to the rotating shaft to partition an internal space of the storage tank, each having a bottom portion thereof formed above a top portion of the transfer part;
    an extension plate coupled to a lower portion of each of the division plates in such a way that the extension plate is movable up and down; and
    a guide formed at an upper portion of the transfer part and configured to guide the extension plate so as to allow the extension plate to be revolved by rotation of the rotating shaft without an interruption with the transfer part.

2. The apparatus of claim 1, wherein a floor of the storage tank is formed in a spiral shape that is split up and down with the transfer part therebetween and is elevated against a direction of rotation of the rotating shaft.

3. The apparatus of claim 1, wherein the extension plate comprises a roller at a lower portion thereof, and
    wherein the guide comprises a rail configured to guide the roller.

4. The apparatus of claim 1, wherein the guide is provided in plurality.

5. The apparatus of claim 1, wherein the extension plate is slidably coupled to each of the division plates.

6. The apparatus of claim 1, wherein the division plates are provided in three that are separated by 120 degrees from one another.

7. The apparatus of claim 1, wherein the transfer part comprises a screw conveyor configured for pulverizing and transferring the gas hydrate pellets.

8. The apparatus of claim 1, further comprising a buffer tank formed at one end of the transfer part and configured for receiving the gas hydrate pellets.

9. The apparatus of claim 8, further comprising a sensor formed on the buffer tank and configured for measuring an amount of gas hydrate pellets received in the buffer tank.

10. The apparatus of claim 9, further comprising a controller configured for controlling a speed of rotation of the rotating shaft by comparing the amount of gas hydrate pellets measured by the sensor against a predetermined value.

11. The apparatus of claim 8, wherein the sensor is provided in plurality at different heights.

12. The apparatus of claim 8, further comprising an up conveyor formed in between the transfer part and the buffer tank and configured for transferring the gas hydrate pellets in an upward direction.

13. The apparatus of claim 11, wherein the up conveyor is a bucket elevator.

14. The apparatus of claim 1, further comprising a temperature control part installed on the storage tank and configured for controlling a temperature inside the storage tank.

15. The apparatus of claim 14, wherein the temperature inside the storage tank is maintained at between −25 degrees and −15 degrees Celsius by the temperature control part.

16. The apparatus of claim 7, wherein a screw of the screw conveyor is configured to have different pitches formed therein along a direction in which the gas hydrate pellets are transferred.

17. The apparatus of claim 16, wherein the screw of the screw conveyor is configured to have the pitches increased along the direction in which the gas hydrate pellets are transferred.

\* \* \* \* \*